June 13, 1939.  A. D. HAYES  2,162,399
BICYCLE SADDLE
Filed Sept. 3, 1936   3 Sheets-Sheet 2

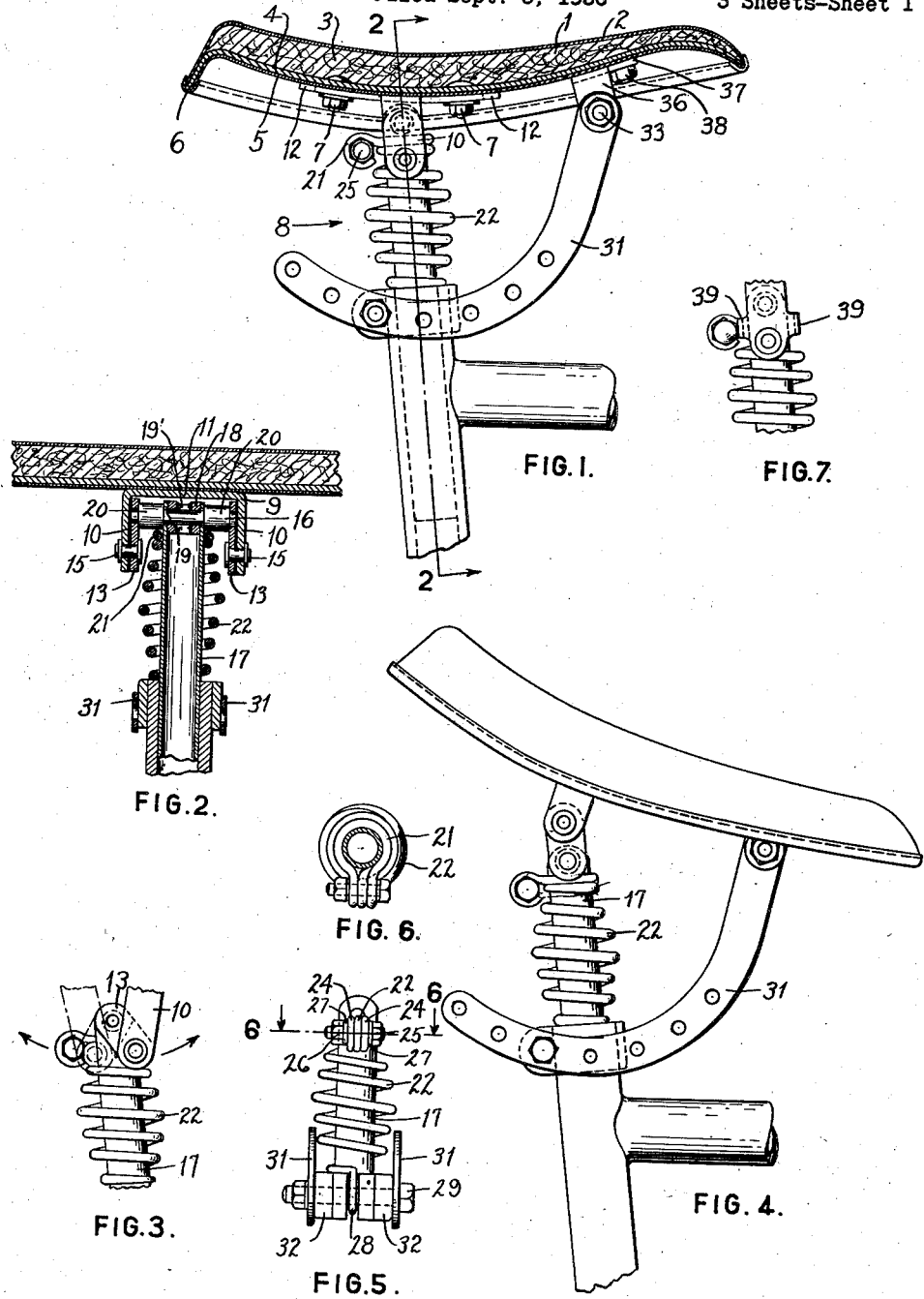

INVENTOR.
ARTHUR D. HAYES
BY Slough & Canfield
His ATTORNEYS.

June 13, 1939.  A. D. HAYES  2,162,399
BICYCLE SADDLE
Filed Sept. 3, 1936  3 Sheets—Sheet 3

INVENTOR.
ARTHUR D. HAYES.
BY
His ATTORNEYS.

Patented June 13, 1939

2,162,399

UNITED STATES PATENT OFFICE 2,162,399

BICYCLE SADDLE

Arthur D. Hayes, Elyria, Ohio, assignor to The Troxel Manufacturing Company, Elyria, Ohio, a corporation of Ohio Application September 3, 1936, Serial No. 99,274

5 Claims. (Cl. 155—5.19)

My invention relates to saddles and relates more particularly to cycle saddles of the type adapted to be used for velocipedes, bicycles, and the like.

An object of my invention is to provide an improved novel means for permitting reciprocating longitudinal movements of the saddle during use and under conditions to achieve a high degree of riding comfort.

Another object of my invention is to provide novel means permitting a limited reciprocating longitudinal movement of the saddle when the same is in operative use.

An object of the present invention is to provide a simplified resilient supporting structure for a cycle saddle preferably involving the use of a single spring, and to provide a further structure in conjunction therewith, which allows a certain back and forth movement of the saddle in respect to the saddle post when the cycle is being ridden.

Another object of my invention is to provide a cycle saddle seat support which will be efficient in operation and economical to manufacture and which at the same time will not detract from the otherwise presentable appearance of the cycle saddle.

Another object of my invention is to provide an improved saddle means employing parts which may be inexpensively and expeditiously manufactured and assembled without the use of expensive machinery, tools, dies, and the like, or requiring the work to be done by highly skilled labor.

Other objects of my invention and the invention itself will become apparent by reference to the following description of an embodiment illustrated in the accompanying drawings.

Referring now to the drawings:

Fig. 1 is a side view partly in elevation and partly in section of an embodiment of my invention;

Fig. 2 is a section taken along the line 2—2 of Fig. 1;

Fig. 3 is a fragmentary view illustrating several of the adjusted positions the crank means employed in my invention may take;

Fig. 4 is a side elevational view of the extended position of the crank means;

Fig. 5 is a view looking from the position of plane 5 of Fig. 1;

Fig. 6 is a section taken on the line 6—6 of Fig. 5;

Fig. 7 is a fragmentary view illustrating a locking means which may be employed as a further embodiment of my invention;

Figure 8:
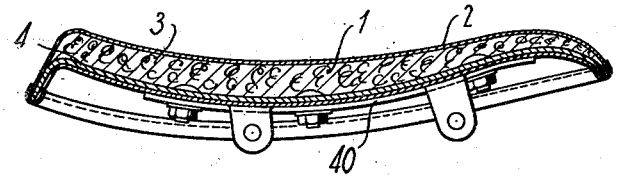
Fig. 8 is a longitudinal sectional view of a modification of my invention.
Figure 9:
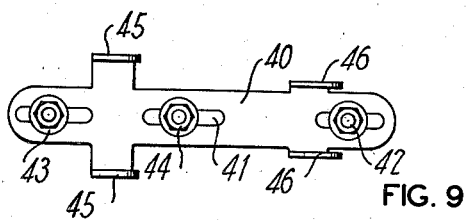
Fig. 9 is a bottom plan view of a plate element illustrated in Fig. 8.

Referring now to the drawings, I have indicated generally at 1 a cycle saddle comprising a leather top covering 2, underlying cushioning material 3, supported upon a metal plate 4, and preferably provided with a leather base underlying the plate 4, as indicated at 5, the peripheral portions of the saddle being joined by suitable binding material 5.

A cycle support structure, indicated generally at 8, comprises a plate member 9, generally U-shaped, having depending arms 10—10, yoke 11, and generally flattened metal ears 12, shaped to conform to the curvature of the saddle seat and secured thereto by two transversely aligned depending studs 7 rigidly threaded in or soldered to said metal plate 4.

Arms 13—13, slightly shorter in length than the depending arms 10—10 of the plate element 9, are loosely secured at one end of the same to the arms 10—10 by rivets 15—15 to permit full rotation therewith and said arms 13—13 are connected at their other or lower ends by a rod 16, which is first press-fitted or swaged to one of said arms 13, projected through aligned perforations 19 in a generally cylindrical saddle post 17 and its tubular reinforcing plug 18 disposed in the upper portion of the said post 17, and then press-fitted or swaged to the other of said arms 13 to form a U-shaped crank member 14 connecting said saddle plate and said saddle post.

A pair of spacing elements 20—20 may, as in the form shown, be telescoped over said rod 16 and disposed between the arms 13—13 of the crank means, and the saddle post 17, and a perforation 19', as shown in Fig. 2, is preferably provided in the plug 18 to permit lubrication of the rod 16.

A wire ring collar 21 is tightly clamped over said saddle post 17, in the manner shown, just below the rod 16, and a spring 22, preferably of the cylindrical type, which is telescoped over said saddle post, has the eye of its uppermost convolution turned between two eyes 24—24 of the wire collar 21 and said eyes 23 and 24—24 are tightly secured together by a bolt 25 and a nut 26.

A pair of washers 27—27 may be used, as illustrated, between the eyes 24—24 of the wire collar and said bolt 25 and nut 26 to more rigidly secure the same.

The lowermost convolution of the spring 22 has its eye 28 turned on a bolt 29 projected through aligned perforations 30—30 disposed in reach members 31—31, which are substantially of J-form and perforated at spaced intervals, as illustrated, for a portion of their length. A pair of spacing elements 32 are preferably telescoped over said bolt and disposed between said reach members 31—31 and said saddle post 17. Said reach members 31—31 are loosely connected at their forward ends to the forward end of the saddle by means of a bolt 33 telescoped through perforations disposed in the extreme forward end of said reach members 31—31 and through aligned perforations in substantially parallel depending arms 36 of a generally U-shaped clip 37 which is rigidly secured at an extension of its yoke member to the forward or pommel portion of the saddle by a stud 38 or other securing means of the type commonly used in the art.

In operation, weight on the saddle is transmitted through the spring to the reach member and any up and down jolting movements which may be imparted to the saddle are taken up in this manner. In my invention, moreover, when the rider pedals or leans forward or back in the operation of a cycle, velocipede, or the like, a limited reciprocating longitudinal movement, as illustrated in Fig. 3 and indicated by arrows therein, is obtained by means of the crank member and, a certain rocking back-and-forth movement is permitted. Thus, in my invention, the saddle moves with the rider to a limited extent and a more comfortable ride is obtained. The saddle might be said to have, in operation, a floating action. In the saddles of the prior art, no longitudinal movement of the saddle was contemplated and as a result, although necessarily the rider moved backwards and forwards on the saddle in propelling his cycle, the saddle remained stationary.

Further, as will be readily understood by those skilled in the art to which my invention appertains, when the cyclist had to pedal up an incline of any appreciable degree, it was extremely difficult to direct the pedalling effort without raising from the saddle and placing the weight forwardly of the normal horizontal position. That is, to say, in the normal position of use over horizontal terrane, the driving force on the pedals is substantially vertical, whereas when the velocipede or cycle is tilted upwards, as on an incline, the driving force initiates farther rearwardly and is correspondingly less effective. Likewise, when the velocipede or cycle is tilted backwards, as when one goes down an incline, the driving force initiates farther forwardly and is correspondingly more effective. Thus, cyclists employing saddles of the prior art were unable to direct the driving force without raising from the saddle, or braking the cycle to an appreciable degree.

The saddle of my invention having reciprocating longitudinal movement, these difficulties are overcome to a great degree and the cyclist is able to direct the driving force in a more effective manner.

In Fig. 4, the fully extended position which the crank member may take is shown. This position is only possible when the cycle is not in operation and the saddle is lifted up at the rear or cantle portion thereof. Fig. 7 illustrates at 39 a pair of lugs or ears with which the plate 9, Figs. 1 and 2, may be provided if desired, which will act as stops to limit the backward and forward movement of the arms 13—13 as illustrated in Fig. 3.

Referring now to Figs. 8 to 12 inclusive, I have illustrated a modified construction generally similar to the embodiment of Figs. 1 to 7 inclusive wherein plate 9 is secured to the rear portion of the saddle and clip 37 secured to the forward portion of the saddle are replaced by a single plate 40 mounted so as to be longitudinally slidable relative to the seat. The plate 40 is provided with a plurality such as three oblong slots 41 through which are projected bolts 42 having washers 43 telescoped thereover to abut the under side of plate 40, the washers being secured by nuts 44. Plate 40 conforms generally to the contour of the saddle supporting plate 4 with both plates 4 and 40 having a substantially common center of curvature whereby the seat may slide upon plate 40 under the impulse of the bicycle operator.

Rearwardly plate 40 is provided with lateral extensions terminating in downturned perforated ears 45—45 adapted to be engaged by rivets 15 to be reciprocatingly supported as illustrated in Fig. 2. The forward portion of plate 40 is provided with downturned perforated ears 46—46 adapted to engage bolt 33 and be secured to reach members 31—31 whereby the pommel portion of the saddle will be supported by the reach members as illustrated in Fig. 1.

Figure 10:
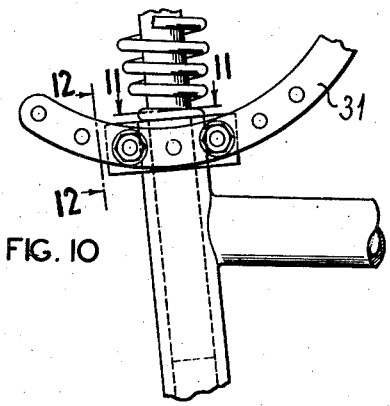
Fig. 10 is a fragmentary elevational view showing a modified clamping arrangement for the reach member.
Figure 11:
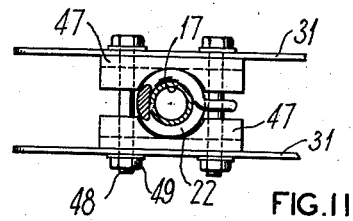
Fig. 11 is a section taken along the line 11—11 of Fig. 10.
Figure 12:
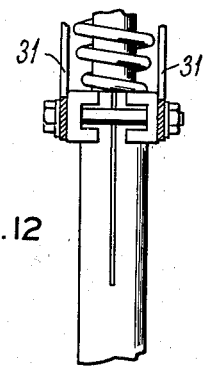
Fig. 12 is a section taken along the line 12—12 of Fig. 10.

Figs. 10 to 12 inclusive show a modified arrangement for supporting the lower end of reach members 31 comprising generally channel shaped clamps 47—47 shaped to grip the cycle frame post and secured by bolts 48 projected through the perforations provided in the lower portion of reach members 31 and secured by nuts 49. Lock washers may be provided if desired to insure a continued tight gripping engagement of the clamp with the cycle post.

The spacing between bolts 48 is such that a perforation of the reach members 31 is disposed therebetween permitting a wide range of adjustment for the reach members.

Figure 13:
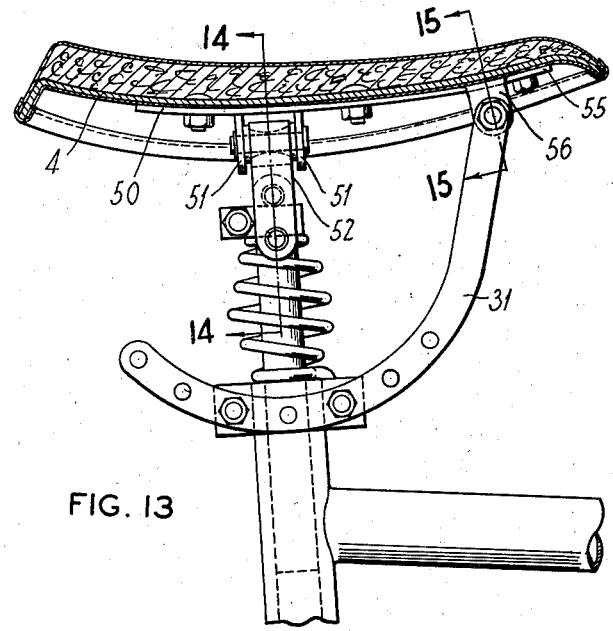
Fig. 13 illustrates a further modification of my invention.
Figure 14:
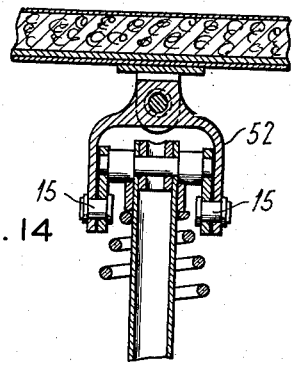
Fig. 14 is a section taken along line 14—14 of Fig. 13.
Figure 15:
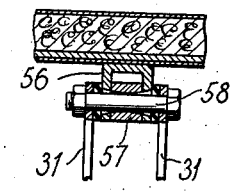
Fig. 15 is a section taken along the line 15—15 of Fig. 13.

Referring now to Figs. 13 to 15 inclusive I have shown a further modification in my invention generally similar to the construction previously described but wherein a universal joint arrangement is provided interconnecting the seat with the saddle post and a limited universal arrangement interconnecting the forward portion of the saddle with the reach members. In this modification a plate element 50 is bolted to supporting plate 4 and is provided with transversely extending depending ears 51—51, the ears receiving therebetween a universal joint element 52.

The element 52 is generally U-shaped and is provided with a transverse perforation with the perforation walls converging centrally whereby a bolt 53 projected through the perforation and through perforations provided therefor in ears 51—51 of plate 50 will have a rocking engagement with element 52. If desired rubber or the like washers may be disposed intermediate ears 51 and element 52 to maintain element 52 spaced therefrom.

The arms of the U-element are provided with aligned perforations which engage rivets 15 whereby the saddle may rock both longitudinally and laterally affording a limited universal movement.

Secured to the under side of the plate 4 adjacent the pommel of the saddle is a plate 55 having depending arms 56—56 perforated for the reception of the ends of a tube 57. The tube inner walls converge centrally whereby a bolt 58 projected therethrough and through aligned perforations provided in the reach members 31 will afford a limited transverse rocking connection between the reach members and the pommel portion of the saddle. As the saddle oscillates or rocks longitudinally the arms 56 will have a slight pivoting movement relative to the reach members 31 and the perforation of element 52 within which bolt 53 is disposed will permit a slight rocking of element 52 relative to arms 51. In tilting the saddle laterally, the arm 51 and plate 50 will pivot about the axis of bolt 53 and the tube 57 will permit a slight lateral rocking relative to the reach members. Thus, a limited universal movement of the saddle is provided permitting lateral and longitudinal rocking or combined rocking movement adding considerably to the comfort of the rider of the bicycle or the like since the saddle accommodates itself to the rider's movements and minimizes the tendency for the rider to slide on the saddle.

The longitudinal and rocking movements heretofore described will occur while the cycle is being ridden and the normal position of the saddle, as illustrated in Figs. 1 and 13, is controlled by adjustment of the reach members 31. Thus, although the saddle may tilt relatively forwardly or rearwardly, the degree of the tilting action, as influenced by the position of the rider, is determined by the normal position of the saddle. If it is desired to tilt the pommel of the saddle downwardly or upwardly, as to normal position, this is effected merely by removing bolt 29 or bolts 48 and re-inserting the bolt or bolts in a defferent set of aligned holes provided in the reach members 31.

My invention is not limited to the exact details of construction shown and described; many changes and modifications may be made within the scope and spirit of my invention without sacrificing its advantages.

What I claim is:

1. A cycle saddle construction comprising a saddle, a saddle post slideably engaging the cycle frame, link means pivotally secured to the saddle and saddle post whereby the saddle may rock relative to the saddle post, resilient means encircling the saddle post and engageable with the saddle post and the cycle frame to yieldingly resist downward movement of the saddle post, and a rigid element pivotally secured to the pommel portion of the saddle and adjustably clamped to the cycle frame whereby the position of the pommel portion of the saddle may be relatively altered.

2. A cycle saddle construction comprising a saddle, a saddle post slideably engaging the cycle frame, a pair of spaced depending arms secured to the saddle, a transversely extending pin secured to the upper portion of the saddle post, link means pivotally secured to the pin at one end and pivotally secured to the arms at the opposite end, resilient means adapted to yieldingly resist downward movement of the saddle post, and rigid connection means pivotally secured to the pommel portion of the saddle and adjustably clamped to the cycle frame to regulate the position of the pommel portion of the saddle.

3. A cycle saddle construction as described in claim 2 and wherein the resilient means comprises a spring encircling the saddle post, and a clamp element adjustable along the saddle post engageable with the spring is adapted to regulate the resisting force of the spring.

4. A cycle saddle construction comprising a saddle, a saddle post slideably engaging the cycle frame, an element secured to the saddle, a second element pivotally secured to the saddle post and pivotally secured to the first element below the pivotal connection with the saddle post whereby the saddle may rock relative to the saddle post, and a member rigidly affixed to the cycle frame and pivotally engaging the pommel portion of the saddle, whereby the saddle may rock rearwardly and pivot forwardly about a pivotal connection of the member and said saddle, said member adapted to be adjusted to relatively alter the position of the pommel portion of the saddle.

5. A cycle saddle construction comprising a saddle, a saddle post slideably engaging the cycle frame, an element secured to the saddle, a second element pivotally secured to the saddle post and pivotally secured to the first element below the pivotal connection with the saddle post whereby the saddle may rock relative to the saddle post, a member rigidly affixed to the cycle frame and pivotally engaging the pommel portion of the saddle whereby the saddle may rock rearwardly and pivot forwardly about a pivotal connection of the member and saddle, resilient means adapted to yieldingly resist downward movement of the saddle post and a clamping member movable along the saddle post provided to adjustably regulate the yielding force of the resilient means.

ARTHUR D. HAYES.